US011120120B2

(12) United States Patent
Abidin et al.

(10) Patent No.: US 11,120,120 B2
(45) Date of Patent: Sep. 14, 2021

(54) METHOD AND SYSTEM FOR SECURE PASSWORD STORAGE (71) Applicant: Authentico Technologies AB, Gothenburg (SE)

(72) Inventors: Aysajan Abidin, Heverlee (BE); Philip Lundin, Gothenburg (SE)

(73) Assignee: Authentico Technologies AB, Gothenburg (SE)

( * ) Notice: Subject to any disclaimer, the term of this patent is extended or adjusted under 35 U.S.C. 154(b) by 51 days.

(21) Appl. No.: 16/091,556

(22) PCT Filed: Mar. 29, 2017

(86) PCT No.: PCT/SE2017/050303
§ 371 (c)(1),
(2) Date: Oct. 5, 2018

(87) PCT Pub. No.: WO2017/176192
PCT Pub. Date: Oct. 12, 2017

(65) Prior Publication Data
US 2019/0108328 A1    Apr. 11, 2019

(30) Foreign Application Priority Data

Apr. 8, 2016 (SE) .................... 1650475-5

(51) Int. Cl.
*G06F 21/45* (2013.01)
*H04L 9/08* (2006.01)
(Continued)

(52) U.S. Cl.
CPC .............. *G06F 21/45* (2013.01); *G06F 21/31* (2013.01); *G06F 21/32* (2013.01); *G06F 21/44* (2013.01);
(Continued)

(58) Field of Classification Search
None
See application file for complete search history.

(56) References Cited

U.S. PATENT DOCUMENTS 8,819,444 B2    8/2014 Shahbazi et al.
8,868,923 B1 *  10/2014 Hamlet .................. G06F 21/32
                                                         713/186
(Continued)

FOREIGN PATENT DOCUMENTS

EP    2890040 A1    7/2015
WO    2008068644 A1   6/2008

OTHER PUBLICATIONS

Almeshekah, M.H., et al. "Ersatzpasswords: Ending password cracking and detecting password leakage" Dec. 7, 2015, ACSAC 2015 Proceedings of the 31st Annual Computer Security Applications Conference, pp. 311-320 (11 pages) (2015).
(Continued)

*Primary Examiner* — William J. Goodchild
(74) *Attorney, Agent, or Firm* — RMCK Law Group, PLC (57) ABSTRACT

The present disclosure relates to a method and system for secure password storage. In particular, the present disclosure relates to a computer implemented method making use of a hardware element in the form of a physical unclonable function (PUF) and forming a fuzzy version of the password, thus making remote password storage less risky for an end user. The disclosure also relates to a corresponding password storage system and to a computer program product.

19 Claims, 4 Drawing Sheets

(51) Int. Cl.
| | |
|---|---|
| *H04L 9/32* | (2006.01) |
| *G06F 21/31* | (2013.01) |
| *G06F 21/44* | (2013.01) |
| *G06F 21/32* | (2013.01) |
| *G06F 21/60* | (2013.01) |
| *H04L 29/06* | (2006.01) |

(52) U.S. Cl.
CPC .......... *G06F 21/602* (2013.01); *H04L 9/0866* (2013.01); *H04L 9/0894* (2013.01); *H04L 9/0897* (2013.01); *H04L 9/3278* (2013.01); *H04L 63/0428* (2013.01)

(56) References Cited

U.S. PATENT DOCUMENTS

| | | | |
|---|---|---|---|
| 2013/0010957 A1* | 1/2013 | Yu | H04L 9/0844 380/260 |
| 2014/0032933 A1 | 1/2014 | Smith et al. | |
| 2014/0091832 A1 | 4/2014 | Gotze et al. | |
| 2015/0222430 A1* | 8/2015 | Kim | H04L 9/3226 380/44 |
| 2015/0318994 A1* | 11/2015 | Walsh | H04L 9/3278 713/182 |
| 2016/0065378 A1* | 3/2016 | Kim | H04L 9/0866 713/184 |

OTHER PUBLICATIONS

International Search Report and Written Opinion for International Application No. PCT/SE2017/050303 dated Jun. 9, 2017, 18 pages.
Swedish Office Action for Swedish Application No. 1650475-5 dated Oct. 18, 2016, 10 pages.
Swedish Office Action for Swedish Application No. 1650475-5 dated Jun. 9, 2017, 8 pages.
Extended European Search Report dated Oct. 22, 2019 for EP Application No. 17779436.9, 9 pages.
Mohammadinodoushan, M. et al., "Implementation of Password Management System Using Ternary Addressable PUF Generator," SECON 2019 Workshop on Security Trust and Privacy in Emerging Cyper-Physical Systems, IEEE, 2019, 8 pages.

* cited by examiner

METHOD AND SYSTEM FOR SECURE PASSWORD STORAGE

CROSS-REFERENCE TO RELATED APPLICATIONS

This application is a 371 U.S. National Stage of International Application No. PCT/SE2017/050303, filed Mar. 29, 2017, which claims priority to Swedish Application No. 1650475-5, filed Apr. 8, 2016. The disclosures of the above applications are incorporated herein by reference in their entirety.

TECHNICAL FIELD

The present disclosure relates to a method and system for secure password storage. In particular, the present disclosure relates to a computer implemented method making use of a hardware element in the form of a physical unclonable function (PUF) and forming a fuzzy version of the password, thus making remote password storage less risky for an end user. The disclosure also relates to a corresponding password storage system and to a computer program product.

BACKGROUND OF THE INVENTION

When storing e.g. user passwords at an Internet connected server comprising a database, such as a cloud server, it is necessary to place a lot of effort into preventing security breaches such that the passwords become available to e.g. a hacker. A typical way of increasing the security of the database/cloud server is to encrypt the passwords, such that they only may be accessed by a user having the correct encryption/decryption key.

However, there is an obvious risk that a third-party with enough resources will be able to decipher the passwords. That is, in case the cloud server is hacked this may have serious impact on a large plurality of users having stored their passwords data at the cloud server. In most cases, a central database will encrypt passwords once received using the same key. Thus, if the system is successfully hacked, all passwords stored at the database can be compromised. Obviously, such an issue could greatly impact on the user's view on the company storing the passwords, thus possibly having a great impact on the business and reputation of said company.

An example of an implementation trying to overcome some of these problems is disclosed in U.S. Pat. No. 8,819,444. Specifically, U.S. Pat. No. 8,819,444 implements a solution where the user passwords are never stored at the cloud server. Rather, the user enters his password into a browser and the browser submits e.g. a hashed version of the password to the server for validation. Credential management is thus decentralized in that encryption and decryption of the user's personal information happens on the user's system.

The suggested implementation will improve the security of the database/server, however also a hashed version of the password could potentially be useful for a hacker. Thus, it would be desirable to additionally improve the security when storing e.g. user passwords at a cloud server/database, ideally limiting the usefulness of the data stored at the cloud server in case of a hacker getting access to the data.

SUMMARY OF THE INVENTION

According to a first aspect of the disclosure, the above is at least partly met by a password storage arrangement, comprising a computer memory, a hardware element implemented as a physical unclonable function (PUF), and processing circuitry arranged in communication with and to control the computer memory and the PUF, wherein the processing circuitry is configured to receive a user password through an interface comprised with the processing circuitry, provide the user password as a direct input to the PUF, wherein the PUF generates an output being a representation of the user password and the PUF output is different from the user password, and store the PUF output within the computer memory.

The present inventor has identified that it would be desirable to further limit the security risks in case a hacker would get access to information available at a cloud server/database (e.g. where the password storage arrangement may be comprised), even if the information would be stored in as encrypted or hashed information.

In accordance to the invention, the information stored at the cloud server/database will not be useful if separated from the cloud server/database, due to the fact that a PUF is a hardware element comprised with the password storage arrangement. Thus, the PUF forms an essential part of both the process of storing the password at the computer memory as well as for password verification. Accordingly, any information stored with the computer memory will be useless unless also having access to the PUF hardware. Therefore, in case the information stored at the computer memory would get downloaded by a hacker, the information in itself would not be of any benefit for the hacker.

The PUF will by definition be specific for each password storage arrangement and thus not possible to duplicate and arrange at a second/separate password storage arrangement. Thus, even in case the hacker would get access to the information available at the computer memory/database/cloud server, this information will not be useful without the physical access to also the PUF.

The PUF is a function that is embodied in a physical structure and is easy to evaluate but hard to predict. An individual PUF device must be easy to make but practically impossible to duplicate, even given the exact manufacturing process that produced it. In this respect PUF, which are the hardware analog of a one-way function, or essentially random functions bound to a physical device in such a way that it is computationally and physically infeasible to predict the output of the function without actually evaluating it using the physical device. It should be understood that the output from the PUF will be slightly different for each time the password is provided as an input, i.e. including a randomness component. Thus, the verification process, as will be discussed further below, will have to take this into account for matching a stored representation of the user password and the representation of a candidate password as provided as an input during the verification process.

In accordance with the present disclosure, the user password is provided to the processing circuitry through an interface comprised with the processing circuitry. The user password may in some embodiments, as will be discussed below, be provided from an "external source" such as an external electronic device. However, the present disclosure is not limited to such an implementation, rather the user password may be provided to the processing circuitry using other means, possibly also including local storage with the password storage arrangement.

In a preferred embodiment of the invention the password storage arrangement further comprises a fuzzy extractor, wherein the processing circuitry is further configured to provide the PUF output to the fuzzy extractor, and store, at the computer memory, an output from the fuzzy extractor as a representation of the user password. As mentioned above, the output from the PUF will comprise a randomness component. A fuzzy extraction on the other hand will have some elements of error-tolerance in the sense that the output from the fuzzy extractor will be essentially the same even if the input (i.e. the PUF output) changes, as long as the input remains reasonably close to the original. Thus, as long as the randomness component comprised with the PUF output is within a predetermined range, the output from the fuzzy extractor will be essentially the same. As understood from the above, this will allow for an improved and simplified verification process as the information provided as an output from the fuzzy extractor will be easier to verify against a candidate password processed using the PUF and the fuzzy extractor, as compared to the case as discussed above where no fuzzy extractor has been comprised with the password storage arrangement In accordance to the invention, it is preferred to format the user password in accordance to a predetermined input specification for the PUF. Accordingly, the format may thus be selected such that the randomness component of the PUF have a desirable (not too high) impact on the PUF output, thereby further simplifying/enhancing the following verification process.

The expression "user password" should be interpreted in the most general sense, including being a "regular" user password to be used for e.g. unlocking a "function". However, the user password may also be e.g. a fixed parameter that may be used for generating the PUF output.

As indicated above, the computer memory, the PUF and the processing circuitry are preferably comprised with a password server connected to an electronic device using a network connection, such as the Internet. The password server is preferably a cloud server. A cloud server should in this example be seen as possible to connect to through the Internet, possibly provided as a distributed over more than a single resource.

The electronic device is typically provided with a user interface (UI) for receiving the password from the user and configured to transmit the user password to the password server using the network connection.

It should be understood that it may be desirable to encrypt the user password prior to transmitting the password to the password server, thus allowing also the communication between the electronic device and the server to be secure. In such an implementation the server will decrypt the password prior to providing the password as an input to the PUF.

In an alternative embodiment of the invention the computer memory, the PUF and the processing circuitry are instead comprised with the electronic device, and the electronic device further comprises a user interface (UI) for receiving the password from the user. That is, it would be possible to also employ the inventive concept to a stand-alone user device, such as a laptop, mobile, tablet, thereby improving also local password storage.

In the following, the electronic device may in some embodiments below also be referred to as a user device or a client device.

The processing circuitry is preferably further configured to receive an authentication request from the user, including a password to be authenticated, provide the password to be authenticated to the PUF, wherein the PUF generates an output being a representation of the password to be authenticated, retrieve the previously stored representation of the password from the computer memory, and determine a matching level between the representation of the password to be authenticated and the previously stored representation of the password.

Accordingly, a verification process may be implemented in a similar manner as for password storage, wherein a candidate password may be provided to the PUF (and possibly the fuzzy extractor), whereby the output is matched to the previously stored representation of the user password. The matching level may typically be set depending on the security level of the system, the randomness component of the PUF and if a fuzzy extractor is comprised with the system. If the matching level is above a predetermined threshold, the user is authenticated.

In an embodiment, the processing circuitry is further configured to store user profile information within the computer memory. In a possible implementation, the user profile information is encrypted prior to storage within the computer memory. The encryption may in some embodiments be performed based upon the user password. As an alternative, the encryption may be performed based upon the PUF output.

In another possible embodiment of the present disclosure, the user password comprises biometric information of a user. Such biometric information may for example relate to one of a fingerprint or an iris of the user. Any other type or biometrics (e.g. DNA) and/or user distinct behavior (e.g. finger/hand movement in space, handwriting or similar) may also be possible within the scope of the invention.

In some implementations the processing circuitry may be adapted to perform a fusion of the PUF output and biometric information for a user. Such an implementation further reduce the possible for e.g. the above mentioned hacker to access the stored information, in this case the biometric information for the user.

This feature of the present disclosure is specifically advantageous in relation to biometric information as biometric information generally (such as in the case of fingerprints and iris) is highly undesirable to "loose", That is, in case biometric information for a user is hacked and e.g. published on the Internet, the user needs to "cancel" this biometric information from further use. However, as the biometric information is connected to the user in a completely different way as compared to a regular password, the user will, once cancelled have lost the possibility of using his biometric information in the future. As a comparison, a user password may always be changed if lost; this is not possible with biometric information connected to a user.

According to a second aspect of the disclosure there is provided a computer implemented method for operating a password storage arrangement, wherein the password storage arrangement comprises a computer memory, a hardware element implemented as a physical unclonable function (PUF), and processing circuitry arranged in communication with and to control the computer memory and the PUF, wherein the method comprises the steps of receiving, using the processing circuitry, a user password, providing, using the processing circuitry, the user password as a direct input to the PUF, wherein the PUF generates an output being a representation of the user password and the PUF output is different from the user password, and storing, using the processing circuitry, the PUF output within the computer memory. This aspect of the invention provides similar advantages as discussed above in relation to the first aspect of the disclosure.

In a similar manner as discussed above, the method further comprises receiving, using the processing circuitry, an authentication request for the user, including a password to be authenticated, providing, using the processing circuitry, the password to be authenticated to the PUF, wherein the PUF generates an output being a representation of the password to be authenticated, retrieving, using the processing circuitry, the previously stored representation of the password from the computer memory, and determining, using the processing circuitry, a matching level between the representation of the password to be authenticated and the previously stored representation of the password.

According to a third aspect of the disclosure there is provided a computer program product comprising a non-transitory computer readable medium having stored thereon computer program means for operating a password storage arrangement, wherein the password storage arrangement comprises a computer memory, a hardware element implemented as a physical unclonable function (PUF), and processing circuitry arranged in communication with and to control the computer memory and the PUF, wherein the computer program product comprises code for receiving a user password, code for providing the user password as a direct input to the PUF, wherein the PUF generates an output being a representation of the user password and the PUF output is different from the user password, and code for storing the PUF output within the computer memory. Also this aspect of the invention provides similar advantages as discussed above in relation to the first and second aspects of the disclosure.

A software executed by the processing circuitry for operation in accordance to the invention may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

Some portions of the detailed descriptions which follow are presented in terms of algorithms and symbolic representations of operations. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

The present disclosure will now be described more fully hereinafter with reference to the accompanying drawings, in which example embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout Referring now to the drawings and to FIG. 1 in particular, there is depicted, conceptually, a client-server environment 100 where the present concept may be applied. The client-server environment 100 comprises a plurality of client device 102, 104, 106 and a cloud server 108, where the client devices 102, 104, 106 and the cloud server 108 are connected by means of network connection, such as over the Internet 110.

Figure 1:
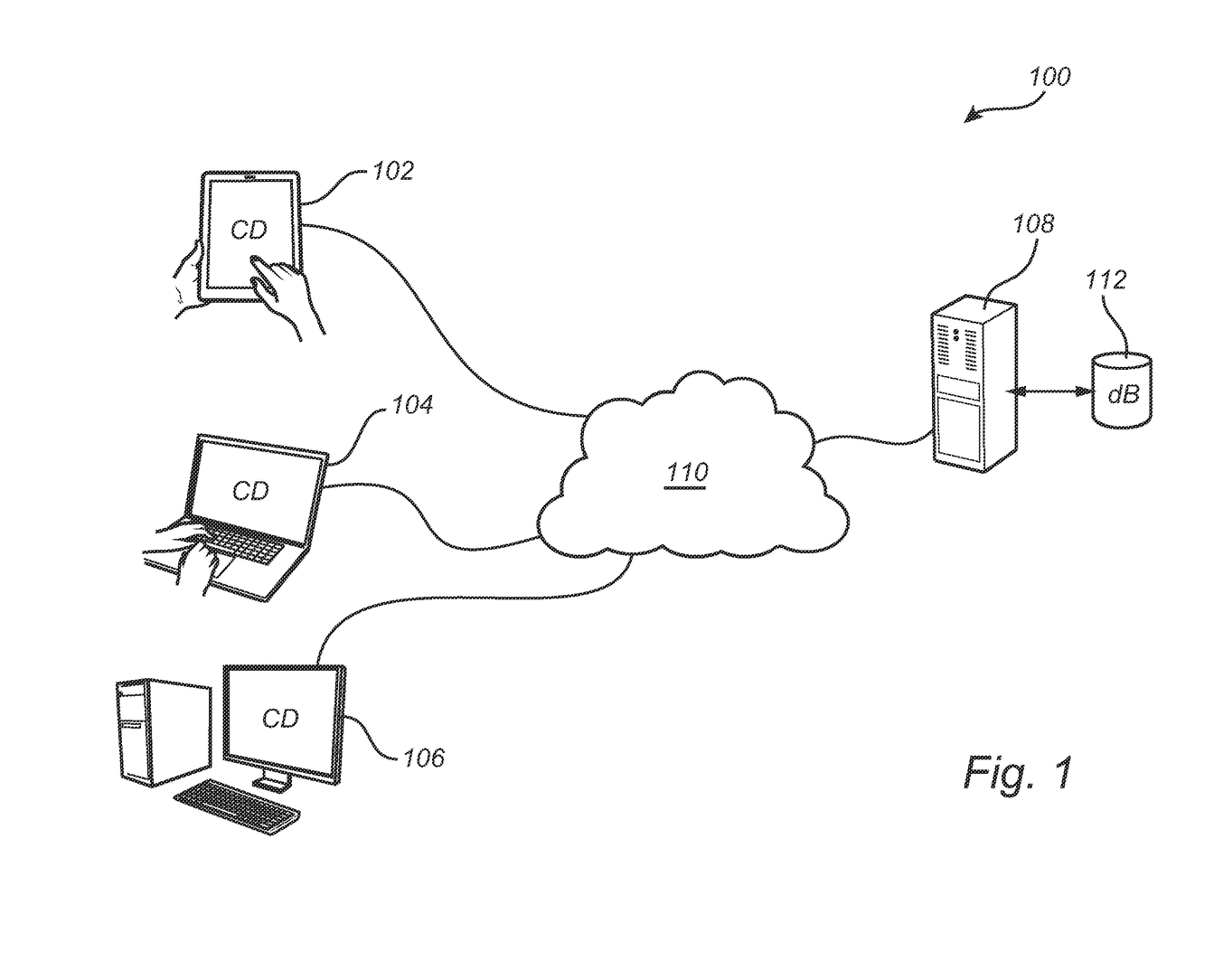
FIG. 1 conceptually illustrates a client-server environment where the present concept may be applied.

As discussed above, the client devices 102, 104, 106 may for example include mobile phones, desktop computers, laptops, tablets, etc. each provided with a web browser. During operation the individual users of the of the client devices 102, 104, 106 may have a desire to access privileged information, for example stored at a database 112 connected to the cloud server 108.

To access the information, a client device such as client device 102 must be verified as the correct user/device for the specific information. In accordance to the invention, with further reference to FIG. 2, the client device 102 must first go through an enrollment process whereby a representation of a user password is stored at a computer memory of the cloud server 108.

For enrolling the user in accordance to the invention, the cloud server 108 is arranged as a password storage arrangement 200, comprises a password format module 202, a PUF 204, a fuzzy extractor 206 and a computer memory 208. In addition, processing circuitry (identified as "µ" in FIG. 2) is typically electrically connected to and configured to control the password format module 202, the PUF 204, the fuzzy extractor 206 and the computer memory 208.

Figure 2:
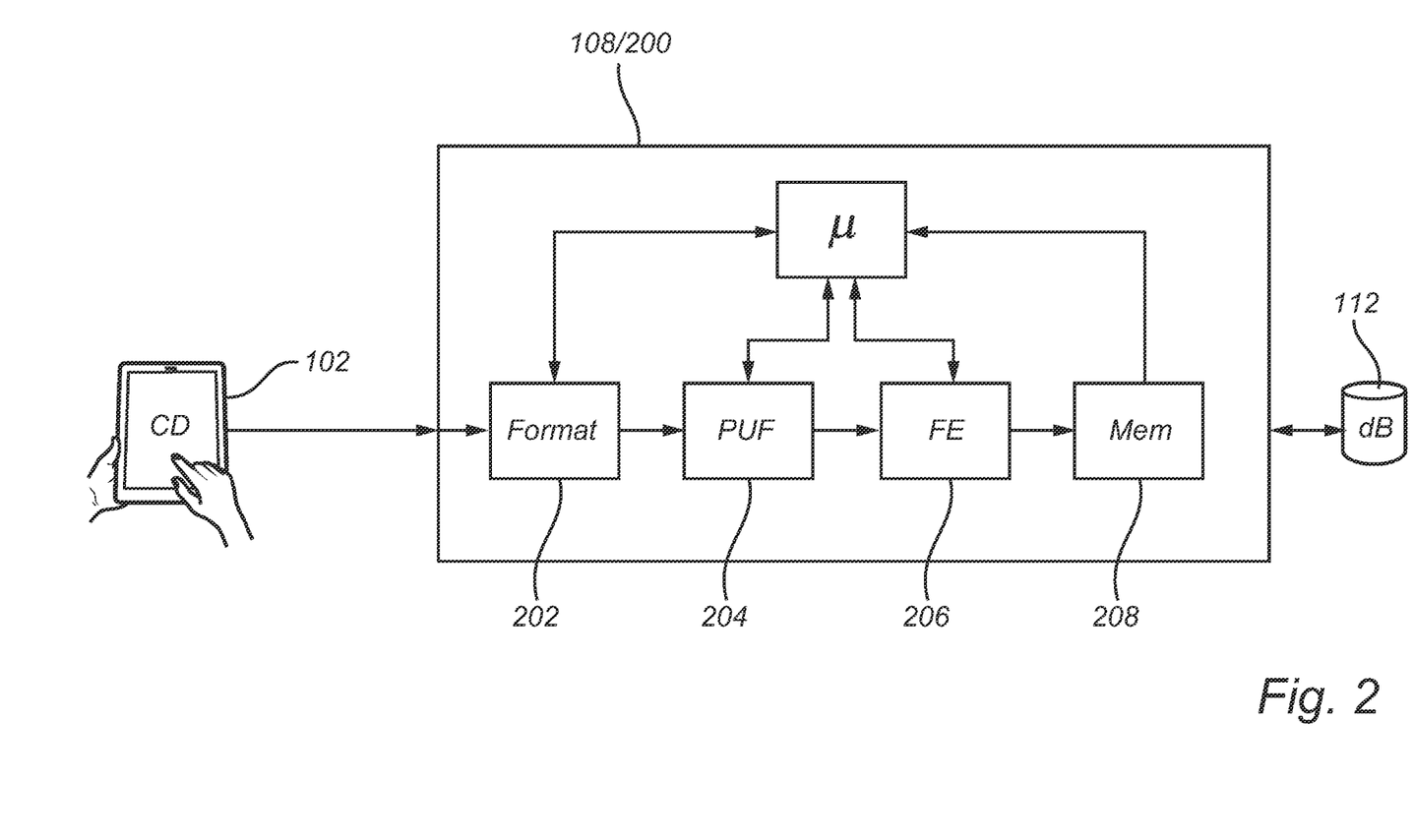
FIG. 2 shows a cloud server/password storage arrangement according to an embodiment of the invention, and FIGS. 3a and 3b provides flow charts showing the method steps according to currently preferred embodiments of the invention.
Figure 3A:
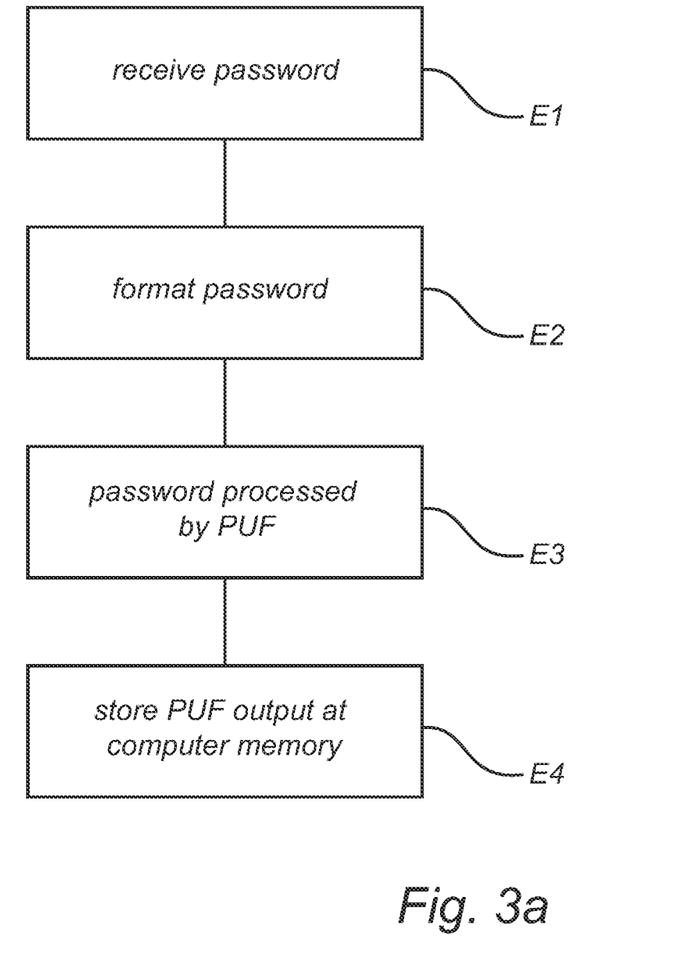

During the enrollment operation of the password storage arrangement 200 with further reference to FIG. 3a, the client device 102 provides user credentials (typically including a username/user ID and a thereto related password) to the password storage arrangement 200 over the network connection 110. The password is received, E1, at a network interface of the password storage arrangement 200 and forwarded to the format module 202, where the password is rearranged/formatted, E2, in a manner suitable for the selected PUF 204, subsequently receiving the formatted password.

As discussed above, the PUF 204 will process, E3, the password in a "one-way processing manner" such that the output from the PUF 204 is clearly different from the password provided as an input to the PUF 204. The output from the PUF 204 is provided as an input to the fuzzy extractor 206 where the fuzzy extractor 206 will provide an element of "filtering" of the output from the PUF 204, whereby at least some part of the randomness between subsequent inputs using the same password will be removed.

The output from the fuzzy extractor 206 will thereafter be stored within the computer memory 208 for further use when the user subsequently needs to be verified.

Figure 3B:
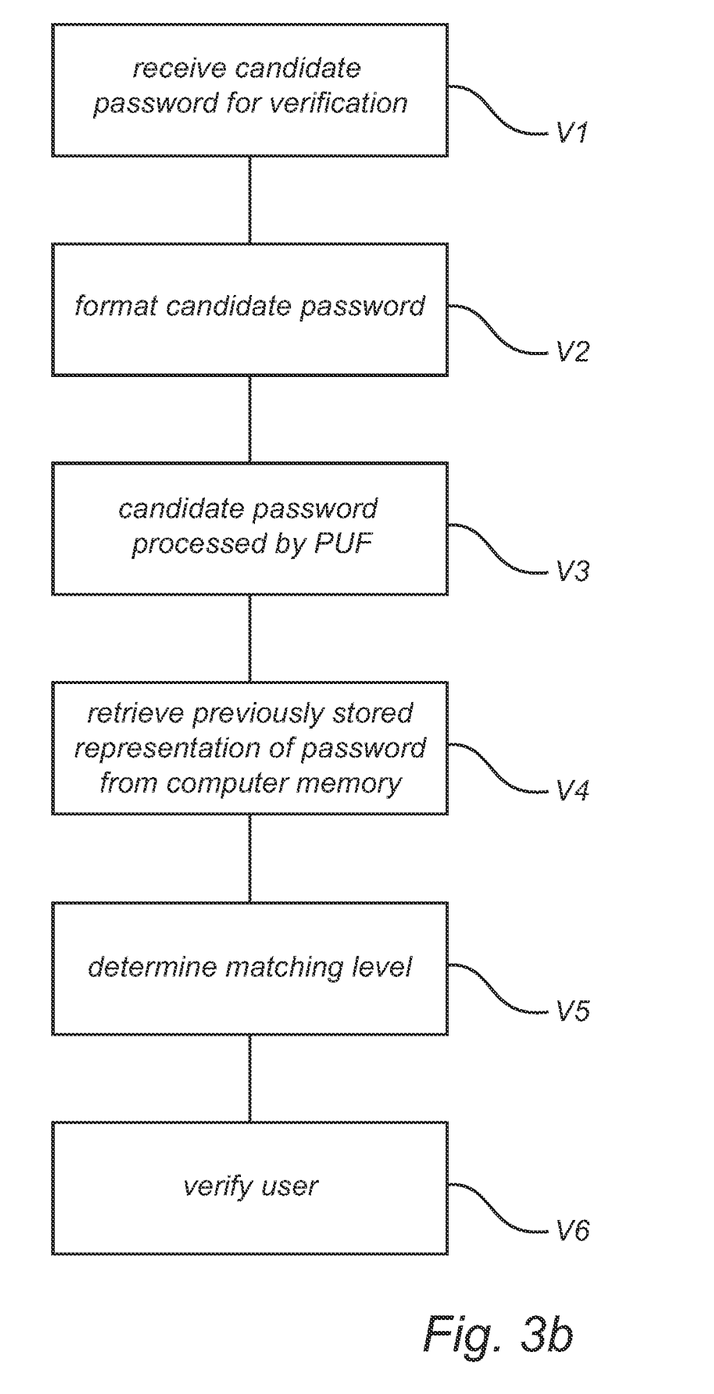

As indicated above, the verification process is at least in part similar to the enrollment process, having further reference to FIG. 3b, i.e. in that the candidate password to be verified is provided from the client device 102 and received, V1, as an input to the password storage arrangement 200.

The candidate password is again formatted, V2, in a similar manner as described above, by the format module 202 and subsequently processed, V3, by the PUF 204 and the fuzzy extractor 206. However, following the PUF/fuzzy extractor process e.g. an attached user ID related to the password is used for retrieving, V4, the previously stored representation of the password from the computer memory 208. The previously stored representation of the password and the processed candidate password is then compared with each other to determine, V5, a matching level.

The comparison between the previously stored representation of the password and the processed candidate password may for example employ a matching algorithm having similarities with the matching process used for matching a candidate fingerprint and a fingerprint template, of course adapted to the format of the previously stored representation of the password and the processed candidate password. Other matching algorithms may of course be used for comparing the previously stored representation of the password and the processed candidate password.

The matching level is thereafter compared to a predetermined threshold, for example dependent on the security level of the password storage arrangement 200 as indicated above. In case the matching level is above the predetermined threshold the user operating the client device 102 is verified and may for example be allowed to access the privileged information stored at the database 112.

The present disclosure contemplates methods and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A password storage arrangement, comprising:
   a computer memory;
   a hardware element implemented as a physical unclonable function (PUF);
   a fuzzy extractor; and
   processing circuitry arranged in communication with and to control the computer memory and the PUF,
   wherein the processing circuitry is configured to:
      receive a user password through an interface comprised with the processing circuitry;
      provide the user password as a direct input to the PUF, wherein the PUF generates an output different from the user password;
      provide the PUF output to the fuzzy extractor; and
      store an output from the fuzzy extractor as a representation of the user password within the computer memory.

2. The password storage arrangement according to claim 1, wherein the processing circuitry is further configured to:

format the user password in accordance to a predetermined input specification for the PUF.

3. The password storage arrangement according to claim 1, wherein the computer memory, the PUF and the processing circuitry are comprised with a password server connected to an electronic device using a network connection.

4. The password storage arrangement according to claim 3, wherein the electronic device is provided with a user interface (UI) for receiving the password from a user and configured to transmit the user password to the password server using the network connection.

5. The password storage arrangement according to claim 4, wherein the electronic device is arranged to encrypt the user password prior to transmitting the password to the password server.

6. The password storage arrangement according to claim 1, wherein the computer memory, the PUF and the processing circuitry are comprised with an electronic device, and the electronic device further comprises a user interface (UI) for receiving the password from a user.

7. The password storage arrangement according to claim 1, wherein the processing circuitry is further configured to:
receive an authentication request for a user, including a password to be authenticated;
provide the password to be authenticated to the PUF, wherein the PUF generates an output being a representation of the password to be authenticated;
retrieve the previously stored representation of the password from the computer memory, and
determine a matching level between the representation of the password to be authenticated and the previously stored representation of the password.

8. The password storage arrangement according to claim 7, wherein the representation of the password to be authenticated is defined as corresponding to the previously stored representation of the password if the matching level is above a predetermined threshold, thereby authenticating the user.

9. The password storage arrangement according to claim 1, wherein the processing circuitry is further configured to:
store user profile information within the computer memory.

10. The password storage arrangement according to claim 9, wherein the processing circuitry is further configured to:
encrypt the user profile information based on the user password.

11. The password storage arrangement according to claim 1, wherein the user password comprises biometric information of a user.

12. The password storage arrangement according to claim 11, wherein the biometric information comprises at least one of information relating to a fingerprint or an iris of the user.

13. The password storage arrangement according to claim 1, wherein the processing circuitry is configured to:
perform fusion of the PUF output and biometric information for a user.

14. The password storage arrangement according to claim 13, wherein the processing circuitry is configured to:
perform the fusion before storing the PUF output within the computer memory.

15. A computer implemented method for operating a password storage arrangement, wherein the password storage arrangement comprises:
a computer memory;
a hardware element implemented as a physical unclonable function (PUF);
a fuzzy extractor; and
processing circuitry arranged in communication with and to control the computer memory and the PUF,
wherein the method comprises the steps of:
receiving, using the processing circuitry, a user password through an interface comprised with the processing circuitry;
providing, using the processing circuitry, the user password as a direct input to the PUF, wherein the PUF generates an output different from the user password;
providing, using the processing circuitry, the PUF output to the fuzzy extractor; and
storing, using the processing circuitry, an output from the fuzzy extractor as a representation of the user password within the computer memory.

16. The method according to claim 15, further comprising the steps of:
receiving, using the processing circuitry, an authentication request for the user, including a password to be authenticated;
providing, using the processing circuitry, the password to be authenticated to the PUF, wherein the PUF generates an output being a representation of the password to be authenticated;
retrieving, using the processing circuitry, the previously stored representation of the password from the computer memory, and
determining, using the processing circuitry, a matching level between the representation of the password to be authenticated and the previously stored representation of the password.

17. The method according to claim 16, further comprising the step of:
authenticating, using the processing circuitry, the user if the matching level is above a predetermined threshold.

18. A computer program product comprising a non-transitory computer readable medium having stored thereon computer program means for operating a password storage arrangement, wherein the password storage arrangement comprises a computer memory, a hardware element implemented as a physical unclonable function (PUF), a fuzzy extractor, and processing circuitry arranged in communication with and to control the computer memory and the PUF, wherein the computer program product comprises:
code for receiving a user password through an interface comprised with the processing circuitry;
code for providing the user password as a direct input to the PUF, wherein the PUF generates an output different from the user password;
code for providing the PUF output to the fuzzy extractor; and
code for storing an output from the fuzzy extractor as a representation of the user password within the computer memory.

19. The computer program product according to claim 18, further comprising:
code for receiving an authentication request for the user, including a password to be authenticated;
code for providing the password to be authenticated to the PUF, wherein the PUF generates an output being a representation of the password to be authenticated;
code for retrieving the previously stored representation of the password from the computer memory, and
code for determining a matching level between the representation of the password to be authenticated and the previously stored representation of the password.

* * * * *